United States Patent
Kinzelmann et al.

(10) Patent No.: US 9,676,977 B2
(45) Date of Patent: Jun. 13, 2017

(54) UV-CURING HOT MELT ADHESIVE CONTAINING LOW CONTENT OF OLIGOMERS

(71) Applicant: Henkel AG & Co. KGaA, Duesseldorf (DE)

(72) Inventors: Hans-Georg Kinzelmann, Pulheim (DE); Yang Cao, Shanghai (CN); Uwe Franken, Dormagen (DE); Hongxia Zhao, Shanghai (CN)

(73) Assignee: Henkel AG & Co. KGaA, Duesseldorf (DE)

(*) Notice: Subject to any disclaimer, the term of this patent is extended or adjusted under 35 U.S.C. 154(b) by 341 days.

(21) Appl. No.: 14/605,087

(22) Filed: Jan. 26, 2015

(65) Prior Publication Data

US 2015/0136319 A1    May 21, 2015

Related U.S. Application Data

(63) Continuation of application No. PCT/CN2012/079190, filed on Jul. 26, 2012, and a continuation of application No. PCT/CN2013/079777, filed on Jul. 22, 2013.

(51) Int. Cl.
| | |
|---|---|
| *C09J 175/14* | (2006.01) |
| *C09J 4/06* | (2006.01) |
| *C08G 18/67* | (2006.01) |
| *C08G 18/76* | (2006.01) |
| *C08G 18/10* | (2006.01) |
| *C08G 18/40* | (2006.01) |
| *C08G 18/42* | (2006.01) |
| *B32B 37/12* | (2006.01) |
| *B32B 37/18* | (2006.01) |
| *B32B 38/00* | (2006.01) |

(52) U.S. Cl.
CPC ......... *C09J 175/14* (2013.01); *B32B 37/1284* (2013.01); *B32B 37/18* (2013.01); *B32B 38/0008* (2013.01); *C08G 18/10* (2013.01); *C08G 18/4018* (2013.01); *C08G 18/4202* (2013.01); *C08G 18/4211* (2013.01); *C08G 18/672* (2013.01); *C08G 18/7671* (2013.01); *C09J 4/06* (2013.01); *B32B 2037/1215* (2013.01); *C08G 2170/20* (2013.01); *C08G 2270/00* (2013.01)

(58) Field of Classification Search
CPC ....... C09J 175/14; C09J 4/06; B32B 37/1284; B32B 37/18; B32B 38/0008; C08G 18/10; C08G 18/4018; C08G 18/4202; C08G 18/4211; C08G 18/672; C08G 18/7671

See application file for complete search history.

(56) References Cited

U.S. PATENT DOCUMENTS

| | | | |
|---|---|---|---|
| 7,186,312 B1 * | 3/2007 | Bolte | B32B 7/12 156/275.5 |
| 2007/0054088 A1 | 3/2007 | Matijasic et al. | |
| 2013/0122287 A1 | 5/2013 | Moeller et al. | |

FOREIGN PATENT DOCUMENTS

| | | |
|---|---|---|
| CA | 2381628 A1 | 2/2001 |
| CN | 1761713 A | 4/2006 |
| WO | 9836325 A1 | 8/1998 |
| WO | 0112691 A1 | 2/2001 |
| WO | 2009077865 A2 | 6/2009 |
| WO | 2011107546 A1 | 9/2011 |

OTHER PUBLICATIONS

International Search Report for International Application No. PCT/CN2013/079777 dated Oct. 31, 2013.
International Search Report for International Application No. PCT/CN2012/079190 dated May 2, 2013.

* cited by examiner

*Primary Examiner* — Daniel McNally
(74) *Attorney, Agent, or Firm* — James E. Piotrowski

(57) ABSTRACT

A reactive hot melt adhesive comprising a blend of a (meth)acrylate polymer, a polyurethane polymer containing (meth)acrylate groups and a polyurethane prepolymer containing NCO-groups wherein the content of low molecular weight (meth)acrylate urethanes is less than 1 wt % of the adhesive. The adhesive provides a fast and improved green strength during application.

16 Claims, No Drawings

UV-CURING HOT MELT ADHESIVE CONTAINING LOW CONTENT OF OLIGOMERS

The invention relates to a hot melt adhesive composition comprising reactive polyurethane prepolymers, (meth)acrylate polymers and polyurethane polymers containing unsaturated double bonds. The polymeric composition shall incorporate only small amounts of urethane based acrylic oligomers.

WO2001/012691 discloses polyurethane prepolymers which shall contain PU prepolymers which are reacted as a mixture of OH-containing acrylic polymers, isocyanates, polyols, and OH-containing acrylic monomers during the manufacturing process. So such mixture will include thereafter also acrylic-isocyanate oligomeric reaction products.

WO 2003/055929 discloses reaction products of polyol components with high molecular weight polyisocyanates. The high molecular weight polyisocyanates are discussed as having only a low content or monomeric diisocyanates.

WO 2006/015659 discloses polymeric binders comprising mixtures of UV-curing polymers, oligomers and fillers or pigments as nano scale products. As UV-curing polymer a list of possible compounds is disclosed. Non reactive polyacrylates are not disclosed.

Humidity curing PU-adhesives are generally known. They need a relatively long time to cure, so the substrates to be bonded have to be fixed during this period. In case of hot melt adhesives, the cooling of the melt provides a first bonding force, so that no long fixing process is required. It is known that the application process of hot melts is depending on the viscosity that means high molecular weight polymers solidify easier and provide an improved green strength. In contrast to this advantage the melt viscosity is high, so for an improved application elevated temperatures are required. This high temperature may destruct the substrate. Additionally low molecular weight monomeric substances may evaporate and will require additional measures for workers health sustainment.

UV-curing systems will cross-link very fast. They may comprise low molecular weight reactive acrylate components, which reduce the viscosity of such compositions. But such low molecular weight acrylate monomers shall be avoided for environmental reasons. Additionally the adhesion to different surfaces is lower than the known PU-adhesives.

It is the object of the present invention to provide a hot melt adhesive which can be applied at lower temperatures and which provide an improved green strength during application. So substrates can be bonded under moderate conditions and at the same time it is not necessary to fix the substrates until final curing. So an in-line bonding process is possible. Additionally the amount of hazardous substances shall be reduced.

The object is achieved by a reactive hot melt adhesive comprising a blend of a (meth)acrylate polymer, a polyurethane polymer containing (meth)acrylate groups and a polyurethane prepolymer containing NCO-groups wherein the content of low molecular weight (meth)acrylate urethanes is less than 1 wt % of the adhesive.

The invention also includes a process to manufacture a UV-curing and NCO-curing hot melt adhesive, which composition shall contain only reduced amounts of monomeric isocyanates and acrylic monomers.

The composition according to the invention shall comprise three different components. One component is a reactive PU prepolymer which shall include NCO-groups which can be cross-linked by reaction with moisture. Another component of the composition is a PU polymer which shall comprise unsaturated double bonds which may react under UV-radiation. The third component of the composition are polymers based on (meth)acrylate monomers which can be blended with the other components of the composition.

Polyurethane prepolymers are known in the art. Generally they comprise reaction products of polyols with an excess of polyisocyanates to obtain a polyurethane chain which comprises still NCO-groups bound to the polymeric chain. By selection of the polyols and the isocyanates as di-functional components it is possible to obtain liquid or meltable non-gelled reactive PUs. By selection of the NCO:OH ratio it is possible to control the molecular weight and the amount of reactive NCO groups in the prepolymer.

According to the invention the PU prepolymer shall preferably be prepared from polyesterpolyols, polyetherpolyols and/or polyalkylene diols as single component or as mixture by reaction with polyisocyanates.

One group of suitable prepolymers is based on polyesters. They can be produced by the reaction of polyester polyols with diisocyanates. Suitable polyester polyols are reaction products of polyhydric, preferably dihydric alcohols, optionally together with minor amounts of trihydric alcohols, and polyfunctional, preferably difunctional and/or trifunctional carboxylic acids. Instead of free polycarboxylic acids, the corresponding polycarboxylic acid anhydrides or corresponding polycarboxylic acid esters with alcohols having preferably 1 to 3 carbon atoms can also be employed. For the production of such polyester polyols, suitable exemplary diols are ethylene glycol, 1,2- or 1,3-propane diol, 1,2- or 1,4-butane diol, pentane diol, the isomeric hexane diols, octane diol, 1,4-hydroxymethylcyclohexane, 2-methyl-1,3-propane diol, 1,2,4-butane triol, triethylene glycol, tetraethylene glycol, polyethylene glycol, dipropylene glycol, polypropylene glycol, dibutylene glycol or polybutylene glycol. Aromatic diols can also be used.

Suitable polycarboxylic acids can be selected from aliphatic, cycloaliphatic, aromatic or heterocyclic or both. They can be optionally substituted, for example by alkyl groups, alkenyl groups, ether groups or halides. Suitable examples include succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, glutaric anhydride, maleic acid, maleic anhydride, fumaric acid, dimer fatty acids or mixtures thereof. Examples for tricarboxylic acids include citric acid or trimellitic acid which can optionally be comprised.

OH-functional polyesters are known to the person skilled in the art and are commercially available. Polyester polyols possessing three or especially two terminal OH groups are particularly preferred.

However, polyester polyols of oleochemical origin may also be used. Such types of polyester polyols can be manufactured by the total ring opening of epoxidized triglycerides of a fat mixture comprising at least partially olefinically unsaturated fatty acids with one or more alcohols having 1 to 12 carbon atoms and subsequently partially transesterifying the triglyceride derivatives to alkyl ester polyols having 1 to 12 carbon atoms in the alkyl group.

Polyester polyols preferably have a molecular mass of ca. 200 to 5000 g/mol, especially below 2000 g/mol (number average molecular mass, $M_N$, measured by GPC). In particular polyester polyols containing aromatic structures in the polymer backbone are also suitable.

Another group of suitable prepolymers is based on polyether polyols. They are produced for example by reacting polyether polyols with an excess of polyisocyanates.

Examples of polyether polyols include the reaction products of low molecular polyhydric alcohols with alkylene oxides. The alkylene oxides preferably comprise 2 to 4 carbon atoms. Suitable examples include reaction products of ethylene oxide, propylene oxide, butylene oxide or mixtures thereof with aliphatic diols, such as ethylene glycol, 1,2-propane diol, 1,3-propane diol, the isomers of butane diols, hexane diols, 2,2-dimethyl-1,3-propane diol, 2-methylpropane diol, 1,6-hexane diol, 2,4,4-trimethylhexane1,6-diol, 2,2,4-trimethylhexane-1,6-diol, 1,4-cyclohexane dimethanol, or of aromatic diols, such as 4,4'-dihydroxydiphenylpropane (Bisphenol A), Bisphenol F, pyrocatechol, resorcinol, hydroquinone or mixtures thereof. Furthermore, the reaction products of polyhydric alcohols, such as glycerin, trimethylolethane or trimethylolpropane, pentaerythritol or sugar alcohols with the alkylene oxides are also suitable. In the context of the invention, further suitable polyols are obtained by polymerizing tetrahydrofuran (poly-THF).

The polyether polyols are produced in a manner known to the person skilled in the art and are commercially available. According to the invention, low molecular weight polyethers should be chosen. Particularly suitable polyether polyols have a molecular mass of 200 to 5000 g/mol, especially up to 3000 g/mol, advantageously up to 1500 g/mol (number average molecular mass, $M_N$, measured by GPC). Diols are particularly suitable, such as homopolymers of polyethylene glycol, propylene glycol, block or statistical copolymers of ethylene glycol and propylene glycol, in particular those that comprise secondary hydroxyl groups.

Also polyalkylene diols can be used to prepare PU prepolymers. Polyalkylene diols have the general structure HO—$(CH_2)_n$—OH, n=2 to 24, preferably up to 12.

It is also possible to use branched polyols. Preferably the OH-groups are situated at the end of the polymer chain. Polyalkylene diols can be used as single component, but preferably they are used only in mixture with polyether or polyester polyols.

The mixture of polyols, preferably diols, is reacted with a stoichiometric excess of polyisocyanates. The known aliphatic or aromatic diisocyanates are suitable. They have a molecular mass of less than 500 g/mol. Exemplary suitable diisocyanates that can be used are ethylene diisocyanate, 1,4-tetramethylene diisocyanate, 1,4-tetramethoxybutane diisocyanate, 1,6-hexamethylendiisocyanat (HDI), cyclohexane-1,3- and -1,4-diisocyanate, bis(2-isocyanato-ethyl) fumarate, 2,4- and 2,6-hexahydrotoluylene diisocyanate, hexahydro-1,3- or -1,4-phenylene diisocyanate, 1,6-diisocyanato-2,2,4-trimethylhexane, 1,6-diisocyanato-2,4,4-trimethylhexane, xylylene diisocyanate (XDI), tetramethylxylylene diisocyanate (TMXDI), 1,3- and 1,4-phenylene diisocyanate, hydrogenated cycloalkyl derivatives of the MDIs, for example completely hydrogenated MDI (H12-MDI), mono-, di-, tri- or tetra-alkyldiphenylmethane diisocyanate.

Another embodiment uses asymmetric isocyanates that comprise NCO groups with a different reactivity towards diols. Exemplary suitable cycloaliphatic asymmetric diisocyanates are 1-isocyanato methyl-3-iso-cyanato-1,5,5-trimethylcyclohexane (isophorone diisocyanate, IPDI), 1-methyl-2,4-diisocyanato-cyclohexane, 1,4-diisocyanato-2,2,6-trimethylcyclohexane (TMCDI), naphthalene-1,5-diisocyanate (NDI), preferred suitable are aromatic asymmetric diisocyanates like 2,4- or 2,6-toluylene diisocyanate (TDI), diphenylmethane-2,4'-diisocyanate (MDI) as well as mixtures of the 4,4'-diphenylmethane diisocyanate with the 2,4'-MDI isomers, either in isomeric pure form or as the mixture of a plurality of isomers, or hydrogenated products of the abovementioned aromatic diisocyanates. Preferably the PU prepolymer shall be manufactured using aromatic diisocyanates, MDI being particularly preferred.

The reaction of the monomeric diisocyanates with the polyols proceeds at a temperature between 20° C. and 150° C., preferably between 70 and 120° C. The ratio of polyols and isocyanates is selected such that NCO-terminated prepolymers are obtained. The reaction control ensures that low-monomer products are obtained. The reaction of the polyester polyols can be effected according to known processes. Low contents of monomeric isocyanates should be obtained, for example below 10 wt %, especially below 5 wt % (measured according to DIN 55672-1). The selected ratio of diol and diisocyanate ensures that no significant molecular weight increase of the prepolymer is obtained. The adhesive shall preferably comprise such PU prepolymer in an amount from 10 to 80 wt %.

Another component of the composition consists of a PU polymer which shall contain unsaturated double bonds. Such bonds can react under UV-radiation. Such PU polymers are manufactured from NCO-terminated PU prepolymers, which are reacted at most of the NCO-groups with components, which contain a UV-curable group and a nucleophilic group, such as a NH, OH or SH group.

As precursor for such component di- or trifunctional PU prepolymers can be prepared in a similar process as disclosed above. For the purpose of the invention the prepolymer shall preferably be manufactured from polyols having a molecular weight of less than 1500 g/mol, preferably less than 1000 g/mol (number average molecular mass, $M_N$, measured by GPC). The polyisocyanate is used in high excess, for example in a NCO/OH ratio from 2:1 to 10:1. In such case generally prepolymers are obtained having terminal NCO groups. Unreacted fractions of the isocyanate are then distilled off under vacuum as monomer. Another embodiment uses an asymmetric isocyanate, thus a distillation can be avoided with a suitable reaction control. So precursor prepolymers are obtained, comprising predominantly the ideal structure of an isocyanate terminated polyol.

These prepolymers should be monomer-poor. This can be achieved by means of reaction control; another approach reduces the amount of free monomeric isocyanates by distillation. The amount of monomeric isocyanates shall be lower than 1 wt %, preferably less than 0.5 wt % based on the prepolymer (measured according to DIN 55672-1). Preferably polyether based prepolymers are used. The polyether prepolymers shall comprise preferably two or three NCO groups. Average functionalities can be achieved by mixing prepolymers, for example with a functionality from 1.8 to 3.3.

The precursor prepolymer is reacted with an compound having a nucleophilic group and one (meth)acrylate function. In a preferred embodiment such compounds correspond to the general formula:

$$H_2C=CR^1-C(=O)-O-R^2-Y$$

$$Y=OH, NHR, SH,$$

$$R^1=H, CH_3, C_2H_5$$

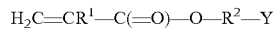

In another embodiment, R² can be substituted by at least one R-O-group, such as a (meth)acryloyloxy-, phenoxy-, toluyloxy-, acetoxy-group. In still another embodiment, R² can be a polyether chain.

Preferred acrylates or methacrylates corresponding to these embodiments are hydroxy(meth)acrylates (Y=OH), for example 2-hydroxyethyl (meth)acrylate, 2-hydroxypropyl (meth)acrylate, 3-hydroxypropyl (meth)acrylate, polyethylene glycol (meth)acrylate, polypropylene glycol (meth)acrylate, 1,3-glycerol di(meth)acrylate, 3-phenoxy-2-hydroxypropyl (meth)acrylate, 3-toluyloxy-2-hydroxypropyl (meth)acrylate, 3-acetoxy-2-hydroxypropyl (meth)acrylate, 2-hydroxybutyl (meth)acrylate, 3-hydroxybutyl (meth)acrylate, 6-hydroxyhexyl (meth)acrylate. The hydroxy acrylates or methacrylates are used individually or in admixture.

The quantities of precursor polymer and hydroxyl (meth)acrylate can be selected in a broad range. Thus, the ratio of the number of NCO groups of the precursor polymer to the number of NCO-reactive groups Y of the (meth)acrylate compound is selected between 1:0.5 to 1:1.01, preferably between 1:0.7 to 1:1.01, more preferably from 1:0.9 to 1:1.0. The ratio is preferably selected that no excess of unreacted monomeric (meth)acrylate is remaining. The molecular weight of such PU polymers containing (meth)acrylate groups is preferably in the range from 500 to 2000 g/mol, particularly preferably to 1500 g/mol (number average molecular mass, MN, measured by GPC). The adhesive shall preferably comprise from 5 to 50 wt-% of such (meth)acrylate substituted PU polymer. As the precursor prepolymer is selected to contain only low amounts of monomeric diisocyanates, the PU polymer shall preferably contain less than 1 wt % of low molecular weight (meth)acrylate urethanes (measured according to DIN 55672-1). The term low molecular weight (meth)acrylate urethanes stands for the reaction products of Y-substituted (meth)acrylate and monomeric mono or diisocyanates which are obtained as side products during the synthesis of the (meth)acrylate substituted PU polymer. Low molecular weight (meth)acrylate urethanes are also referred to as monomeric urethane acrylates. Such low molecular weight side products may react also by UV-curing, but they have a negative influence on the network and molecular weight of reacted unsaturated polymers and render the reaction less reliable.

Another component contained in the composition of the adhesive includes poly(meth)acrylates. Poly(meth)acrylates used in the present invention shall preferably have a molecular weight from 10000 to about 300000 g/mol (number average molecular mass, $M_N$, as measured by GPC). They include polymerisates of esters of (meth)acrylic acids and as comonomer virtually any ethylenically unsaturated comonomer which is polymerizable with such (meth)acrylates.

Acrylic comonomers may be polymerised so as to produce a wide range of Tg values, as between about −20° C. and 105° C., preferably between 15° C. to 85° C. (measured according to ISO 11357-2). Suitable comonomers include the C 1 to C 12 esters of methacrylic and acrylic acids including, but not limited to methyl methacrylate, ethyl methacrylate, n-propyl, iso-propyl methacrylate, n-butyl methacrylate, isobutyl methacrylate, n-hexyl methacrylate, n-octyl methacrylate 2-ethylhexyl methacrylate, dodecyl (lauryl) methacrylate or the corresponding acrylates. Mixtures of compatible (meth)acrylate monomers may also be used. Methacrylic and acrylic comonomers based on esters of methacrylic and acrylic acid with poly(ethylene glycol) and/or poly(propylene glycol and/or glycol ethers may also be used. Other additional vinyl comonomers that may be used include the vinyl esters (e.g. vinyl acetate and vinyl propionate); vinyl ethers; esters of crotonic acid, maleic acid, fumaric acid and itaconic acid; styrene; alkyl styrenes; acrylonitrile; butadiene; etc. as well as comonomers thereof. The particular monomers selected will depend, in large part, upon the end use for which the adhesives are intended. Thus, adhesives to be used in applications wherein adhesion to metal is required will be selected to obtain a lower Tg polymer than may be desired in non-pressure sensitive applications or those involving more easily bonded substrates.

Suitable acid functional comonomers include, but are not limited to, methacrylic acid and acrylic acid. Suitable hydroxyl functionalised comonomers that can be incorporated include, but are not limited to, 2-hydroxyethylmethacrylate, 2-hydroxyl propyl methacrylate and 2-hydroxybutyl methacrylate or the corresponding acrylates.

Preferably the molecular weight (number average molecular mass, $M_N$, as measured by GPC) of suitable poly(meth)acrylates is between 5000 to 200000 g/mol preferably below 100000 g/mol. The adhesive shall comprise 5 to 45 wt % of such polymers.

The adhesive according to the invention may comprise also one or more additives. Additives may improve specific properties of the adhesive, like adhesion, solidification, viscosity, flexibility and stability.

Stabilizers, more particularly UV stabilizers, or antioxidants suitable for use as additives in the adhesive include benzophenone, benzotriazole, hindered piperidine derivatives, phosphites, phenols, sterically hindered phenols, polyfunctional phenols, sulfur- and phosphorus-containing phenols. They are added to the hot melt in quantities of typically about 0.1 to 3.0 wt %.

The adhesive composition may additionally comprise natural or synthetic resins. The natural resins may be of vegetable or of animal origin. Examples of resins include shellac and colophony, gum resins or wood resins. Not only the native natural resins, but also their derivatives are usable, whether these be obtained by disproportionation, dimerisation, hydrogenation, polymerisation, esterification, salt formation or by addition of unsaturated compounds, for example, of maleic acid. Examples or synthetic resins include hydrocarbon, terpene, coumarone/indene, furan, alkyd, aldehyde, ketone, phenol, glycerol ester, polyester, epoxy, urea, melamine, polyamide, and isocyanate resins. The amount added is about 0 to 30 wt % of the total adhesive composition.

The adhesive may additionally contain 0 to 5% by weight of at least one photoinitiator and/or photo sensitizer, preferably more than 0.1 wt %. Basically, any commercially available photoinitiators that are compatible, for example as substantially homogeneous mixtures, can be used. The photoinitiators are substances or mixtures of substances which are stable in the absence of light and, on exposure to radiation, absorb so much energy that they initiate radical or ionic polymerizations.

For special purposes dyes, pigment or fillers can be incorporated in the adhesive. However, in this case it must be ensured that this additive does not inhibit a penetration of the radiation into the adhesive and the polymerisation reaction. Also small amounts of non-reactive thermoplastic polymers different from the three polymeric main compounds can be present. Examples include EVA, styrene block copolymer, thermoplastic polyester, thermoplastic polyurethanes.

As plasticizer components different substances can be selected, for example phthalic acid esters, in particular dialkylphthalate esters, the ester comprising linear alkanols having 4 to 12 carbon atoms. Also esters of benzoic acid, phosphate softeners, for example t-butylphenyl diphenyiphosphat, polyethylene glycols and their derivatives, for example alkylesters of poly(ethyl glycol), glycerole ester of fatty acids and other compounds can be used.

The adhesive may contain additives in an amount from 0.1 to 25 wt %, preferably up to 15 wt %. The selection of the additives and the properties are known to the person skilled in the art.

The composition according to the invention comprises at least three different polymeric components. The components can be prepared in different reaction steps, so it is possible to obtain a PU polymer including unsaturated double bonds which comprises less than 1 wt % of (meth)acrylate urethanes, which are low molecular weight substances. The PU prepolymer can be prepared separately, so that the building of high molecular weight PU prepolymers can be avoided.

The three polymeric components can be blended together in a molten state. So an effective blending is possible. Otherwise it is also possible to manufacture the PU- prepolymer in the presence of the poly(meth)acrylate component. So the viscosity in the manufacturing process can be adjusted by the viscosity of the single components. As example the different additives can be mixed and homogenised with the adhesive composition as last step. The adhesive is solid at room temperature. The viscosity of the adhesive is in the range of 2000 to 20000 mPas at 100° C. (measured according to Brookfield, Digital Viscometer RVT, EN ISO 2555, spindle 27, 10 rpm). The softening point of the adhesive is selected in a range of 80 to 130° C. (measured according to DIN EN 1238, ring and ball test). So also thermosensitive substrates can be bonded.

In one embodiment the reactive hot melt adhesive is manufactured as follows: A low monomer content PU prepolymer is prepared and reacted with at least one OH-containing alkyl(meth)acrylate monomer in an OH:NCO ratio between 0.5:1 to 1.01:1, preferably from 0.7:1 to 1.01:1, more preferably from 0.9:1 to 1.0:1. The resulting PU polymer is being blended with a (meth)acrylate polymer and a NCO-containing PU prepolymer. This NCO-containing PU prepolymer can be identical or different from the PU prepolymer which has been used for the synthesis of the PU polymer. Furthermore this NCO-containing PU-prepolymer can either be prepared separately first and then be added to the composition or alternatively be synthesized in situ from suitable polyols and polyisocyanates. The hot melt adhesive is manufactured at a temperature of 70 to 120° C.

The invention provides an adhesive which can be applied at low temperatures and on substrates which are thermo sensible. The composition shall include only low amounts of reactive monomeric and low molecular weight ingredients. The content of less than 1 wt % of monomeric urethane acrylates improves the fast curing properties and leads to an increased molecular weight of the radiation curing polymers. The cross-linking groups are separated by a polymeric chain, so a network is obtained. The absence of monomeric (meth)acrylates is improving the air pollution during application.

A preferred composition shall comprise 10 to 50 wt % of a reactive PU-polymer containing NCO groups, 20 to 40 wt % of a PU-polymer containing covalently bound (meth) acrylate groups, 25 to 40 wt % of one or more poly(meth) acrylates, and from 1 to 20 wt % of additives. The sum of all components shall add to 100%. The content of monomeric urethane acrylates shall be less than 1 wt %. The composition shall have a viscosity of 2000 to 10000 mPas at 100° C.

Another object of the invention is a process to apply the adhesives as disclosed above. The adhesive according to the invention is a hot melt adhesive. It is solid at 20° C. but it can melt above 100° C. The adhesive will be applied in a molten form. After application to the substrate the composition is subject to radiation in an amount and a wave length to start the cross-linking of the (meth)acrylate groups. Instantly the molecular weight of one component is increased, the green strength of the adhesive bond is increased. The radiation step is performed quickly after application of the adhesive. The substrates are bonded during the open time of the adhesive and fix the substrates for further processing. According to one embodiment the radiation step can be performed on the surface of the adhesive and the reacted adhesive layer is bound to the second substrate. Another embodiment of the process bonds two substrates together and the radiation to the adhesive layer is performed through one substrate. In such case it is preferred to use at least one substrate which shows significant transmission of UV radiation. The final adhesive force is reached after curing the adhesive by NCO reaction. So the crosslinking will still increase and the adhesion of the substrates will improve.

The adhesive composition provides fast building of green strength which is normally connected with a higher molecular weight. On the other hand the application can be performed at lower temperature as during application the molecular weight of the radiation curing material is still low. The second cross-linking process takes place slowly, thus providing an interpenetrating network of a second PU-polymer.

The application of the adhesive to the substrates can take place using machinery commonly employed for such purposes. The viscosity of the binder is chosen such that under typical processing conditions it is about 2000 mPas to about 10000 mPas (measured according to Brookfield, Digital Viscometer RVT, EN ISO 2555, 100° C., spindle 27, 10 rpm).

As the adhesive does practically not contain unreacted monomers, like diisocyanates, or OH-acrylic acid esters, but includes polymeric components having such reactive groups bound to the polymer, during application at elevated temperatures such potentially harmful substances will not evaporate. So workers' health is not negatively influenced by evaporating ingredients of the adhesive. The adhesive will increase its green strength fast, so also thick layers of the adhesive will show a sufficient bonding of the substrates.

The adhesives according to the invention can be used in different application areas for example construction, wood industry, metall bonding or paper bonding. One area of application is the book binding industry. In such application has been shown, that the bonding of the spine of a book paper is improved. The adhesive can be applied in a thick layer at low temperature, immediately after application the layer is subjected to UV curing, so after cooling the green strength is improved and the bonded substrates can be further processed. The adhesion to substrates made of natural products is high and the content of humidity in such substrates can be used for accelerating the curing of the NCO-PU-prepolymers.

EXAMPLES

PU-Polymer Containing Bound (Meth)Acrylate Groups (Polymer A):

10.0% by weight of 2-hydroxyethyl methacrylate and 90.0 wt.-% of demonomerized NCO terminated prepolymer (Desmodur VP LS 2397: a linear prepolymer based on polypropylene ether glycol and diphenylmethane diisocyanate (MDI), NCO content: 5.8 wt % measured according to ISO 11909, monomer content: less than 0.15 wt % measured according to DIN 55672-1) were charged into a steel reactor equipped with a stirrer and thermometer and dried at 80° C. for 7 hours. The resulting prepolymer was placed into a container under a dry nitrogen headspace to prevent the exposure to moisture. Due to the low monomer content of less than 0.15 wt % in the NCO terminated prepolymer, the content of low molecular weight (meth)acrylate urethanes as reactions products of residual monomeric diisocyanate (MDI) and 2-hydroxyethyl methacrylate is less than 1 wt % in the PU polymer.

Polymethacrylate (Polymer B):

The poly(meth)acrylate is a polymerization product of butyl methacrylate, methyl methacrylate and methacrylic acid as copolymer.

MFI is 60 g/10 min at 150° C.

Tg is about 59° C.

Molecular weight ($M_N$) is about 8000 g/mol.

Polyol 1:

Dynacoll 7360, a commercial polyester polyol, molecular weight ($M_N$) about 3500 g/mol, hydroxyl value (OHV) about 30 mg KOH/g solid (measured according to DIN 53240).

Polyol 2:

PPG 2000, OHV about 56 mg KOH/g solid (measured according to DIN 53240).

Polyol 3:

Is a polyester polyol based on diethylene glycol and phthalic acid anhydride

OH-value about 70 mg KOH/g solid (measured according to DIN 53240), equivalent weight about 800 g/mol.

Adhesive, General Procedure:

Polymer A is produced as above. Polymer B is a commercial product.

The adhesive is prepared by blending polymer A, polymer B, polyol 1, polyol 2 and 3 as melt and mixed under vacuum.

Then MDI was added and polymerization allowed to proceed with mixing under vacuum at 120° C. for 1 hour until the reaction is complete. Finally additives were added and the mixing was continued for another 10 minutes.

The content of low molecular weight (meth)acrylate urethanes is less than 1 wt % (measured according to DIN 55672-1).

TABLE 1

Adhesives of sample A, B, C and D

|  | Sample A | Sample B | Sample C | Sample D comparative |
|---|---|---|---|---|
| Polyol 2 | 44.0 | 39.0 | 34.0 | 64.0 |
| Polymer A | 20.0 | 25.0 | 30.0 | — |
| Polymer B | 64.2 | 64.2 | 64.2 | 64.2 |
| Polyol 1 | 77.3 | 77.3 | 77.3 | 77.3 |
| Polyol 3 | 51.3 | 51.3 | 51.3 | 51.3 |
| MDI | 42.3 | 40.9 | 40.5 | 42.3 |
| Catalyst DMDEE | 0.3 | 0.3 | 0.3 | 0.3 |
| Silane coupling agent A189 | 1.5 | 1.5 | 1.5 | 1.5 |
| Photoinitiator TPO-L | 3.0 | 3.0 | 3.0 | — |
| Viscosity (mPas @100° C.) | 3700 | 3900 | 4000 | 4200 |

TABLE 2

Bond strength and open time of sample A, B, C and D

|  | Sample A | Sample B | Sample C | Sample D |
|---|---|---|---|---|
| Stainless Steel-Glass (MPa) | 1.23 | 1.5 | 1.38 | 0.58 |
| PC/ABS-Glass 10 min (MPa) | 1.22 | 1.28 | 1.6 | 0.55 |
| PC/ABS-Stainless Steel (MPa) | 0.89 | 1.37 | 1.38 | 0.38 |
| PC/ABS-PC/ABS (MPa) | 1.26 | 1.22 | 1.25 | 0.42 |
| Open time (minutes, after UV radiation) | 4.0 | 4.0 | 3.5 | 5.0 |

The bond strength after 10 min (also referred to as green strength) and the open time were tested and listed in Table 2. The bond strength is determined by the cross-tensile pull method (according to STM-831). For the determination of the open time the test specimen will be assembled at different waiting times after the application of the adhesive. The bond strength will be measured 24 h after cure as a function of the waiting time. The waiting time after which the bond strength is significantly decreasing is defined as the open time.

All these data show that high initial strength and convenient application conditions can be achieved using this UV dual cure PUR hot melt.

The comparative example D shows less green strength.

Other examples are prepared according to the same general procedure.

TABLE 3

Adhesives of sample D, E, F and G

|  | Sample E | Sample F | Sample G | Sample D comparative |
|---|---|---|---|---|
| Polyol 2 | 44.0 | 44.0 | 44.0 | 64.0 |
| Polymer A | 20.0 | 20.0 | 20.0 | — |
| Polyol 1 | 77.3 | 77.3 | 77.3 | 77.3 |
| Polyol 3 | 51.3 | 51.3 | 51.3 | 51.3 |
| MDI | 42.3 | 40.9 | 40.5 | 42.3 |
| Thermoplastic non reactive polymer | 1.0 | 1.8 | 2.5 | — |
| Polymer B | 63.2 | 62.4 | 61.7 | 64.2 |
| Catalyst DMDEE | 0.3 | 0.3 | 0.3 | 0.3 |
| Silane coupling agent | 1.5 | 1.5 | 1.5 | 1.5 |
| Photoinitiator | 3.0 | 3.0 | 3.0 | — |
| Viscosity (cps @100° C.) | 4200 | 4800 | 5800 | 4200 |

TABLE 4

Bond strength and open time of sample D, E, F and G

|  | Sample E | Sample F | Sample G | Sample D |
|---|---|---|---|---|
| Stainless Steel-Glass (MPa) | 1.25 | 1.27 | 1.38 | 0.58 |
| PC/ABS-Glass (MPa) | 1.31 | 1.31 | 1.54 | 0.55 |
| PC/ABS-Stainless Steel (MPa) | 1.12 | 1.24 | 1.28 | 0.38 |
| PC/ABS-PC/ABS (MPa) | 1.19 | 1.21 | 1.27 | 0.42 |
| Open time (min, after UV radiation) | 3.0 | 3.0 | 2.5 | 5.0 |

Additionally examples are prepared to show the effect of the invention.

TABLE 5

Formulation, bond strength and open time of sample D, H and I

|  | Sample H | Sample I | Sample D comparative |
|---|---|---|---|
| Polyol 2 | 44.0 | 44.0 | 64.0 |
| Polymer A | 20.0 | 20.0 | — |
| Polyol 1 | 77.3 | 77.3 | 77.3 |
| Polyol 3 | 51.3 | 51.3 | 51.3 |
| MDI | 42.3 | 42.3 | 42.3 |
| Thermoplastic non reactive polymer. | 1.0 | 1.0 | — |
| Polymer B | 63.2 | 63.2 | 64.2 |
| Catalyst DMDEE | 0.3 | 0.3 | 0.3 |
| Silane coupling agent A189 | 1.5 | 1.5 | 1.5 |
| Speedcure 84 | 0.75 | 1.5 | — |
| Speedcure TPO-L | 2.25 | 1.5 | — |
| Viscosity (cps @100° C.) | 4200 | 4400 | 4200 |
| Stainless Steel-Glass (MPa) | 1.30 | 1.10 | 0.58 |
| PC/ABS-Glass (MPa) | 1.26 | 0.91 | 0.55 |
| PC/ABS-Stainless Steel (MPa) | 1.22 | 0.86 | 0.38 |
| PC/ABS-PC/ABS (MPa) | 1.32 | 1.02 | 0.42 |
| Open time (min, after UV radiation) | 2.5 | 2.0 | 5.0 |

The adhesives according to the invention have a low viscosity. The application temperature is low.

It is shown, that the adhesives have an improved open time and better adhesion according to the tests.

What is claimed is:

1. A reactive hot melt adhesive comprising a blend of a (meth)acrylate polymer, a polyurethane polymer containing (meth)acrylate groups and a polyurethane prepolymer containing NCO-groups wherein the content of low molecular weight (meth)acrylate urethanes is less than 1 wt % of the adhesive.

2. A hot melt adhesive according to claim 1, wherein the (meth)acrylate polymer has a molecular weight ($M_N$) of more than 5000 g/mol.

3. A hot melt adhesive according to claim 1, wherein the adhesive comprises 5 to 45 wt % of the (meth)acrylate polymer, the (meth)acrylate polymer has a molecular weight ($M_N$) of more than 5000 g/mol and the (meth)acrylate polymer is non reactive.

4. A hot melt adhesive according to claim 1, wherein the polyurethane polymer containing (meth)acrylate groups comprises about 70 to 100 mol % of (meth)acrylate groups and 0 to 30 mol-% of remaining NCO-groups.

5. A hot melt adhesive according to claim 4, wherein the polyurethane polymer containing (meth)acrylate groups is prepared by reaction of a NCO-containing PU-prepolymer comprising less than 1 wt-% of monomeric diisocyanates with OH-alkyl-substituted (meth)acrylate esters in a ratio OH:NCO from 0.7:1 to 1.01:1.

6. A hot melt adhesive according to claim 4, wherein the adhesive comprises 5 to 50 wt % of the polyurethane polymer containing (meth)acrylate groups.

7. A hot melt adhesive according to claim 1, wherein the amount of the polyurethane prepolymer is from 10 to 50 wt-% of the adhesive composition.

8. A hot melt adhesive according to claim 1, optionally further comprising additives, fillers, stabilizers, tackifiers, plasticizers, adhesion promotors or additional non-reactive polymers.

9. A hot melt adhesive according to claim 1, having a viscosity of from 2000 to 20000 mPas at 100° C., measured according to Brookfield, Digital Viscometer RVT, EN ISO 2555, spindle 27, 10 rpm.

10. A hot melt adhesive according to claim 1, having an NCO-value of 2 to 12 wt %.

11. A process to manufacture a hot melt adhesive according to claim 1, comprising:
preparing a low monomer content PU prepolymer;
reacting the prepared low monomer content PU prepolymer with at least one OH-containing alkyl(meth)acrylate monomer in an OH:NCO ratio from 0.7:1 to 1.01:1 to form a PU polymer; and
blending the PU polymer with an NCO-containing PU-prepolymer and a (meth)acrylate polymer.

12. A process to manufacture according to claim 11, wherein the process is carried out at a temperature of 70 to 120° C.

13. A process to manufacture according to claim 12, wherein the (meth)acrylate polymer is free of OH and/or NH groups.

14. A process to bond substrates, comprising;
heating the hot melt adhesive according to claim 1 to a molten state;
applying the molten hot melt adhesive onto a first substrate;
exposing the disposed hot melt adhesive to ultraviolet radiation to initiate curing of that hot melt adhesive; and
disposing a second substrate into contact with the disposed hot melt adhesive in a non-solidified state.

15. A process according to claim 14, wherein the adhesive is applied to the first substrate in an amount of 10 to 500 g/m².

16. Cured reaction products of the hot melt adhesive according to claim 1.

* * * * *

UNITED STATES PATENT AND TRADEMARK OFFICE
CERTIFICATE OF CORRECTION

PATENT NO. : 9,676,977 B2
APPLICATION NO. : 14/605087
DATED : June 13, 2017
INVENTOR(S) : Hans-Georg Kinzelmann et al.

Page 1 of 1

It is certified that error appears in the above-identified patent and that said Letters Patent is hereby corrected as shown below:

In the Specification

Column 7, Line 3: Change "diphenyi" to -- diphenyl --.

Signed and Sealed this
First Day of May, 2018

Andrei Iancu
*Director of the United States Patent and Trademark Office*